(12) United States Patent
Yu et al.

(10) Patent No.: US 11,524,578 B2
(45) Date of Patent: Dec. 13, 2022

(54) CONTROL METHOD AND CONTROL DEVICE FOR VEHICLE DISPLAY DEVICE

(71) Applicant: BOE TECHNOLOGY GROUP CO., LTD., Beijing (CN)

(72) Inventors: Jing Yu, Beijing (CN); Xingxing Zhao, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 333 days.

(21) Appl. No.: 16/647,808

(22) PCT Filed: Mar. 25, 2019

(86) PCT No.: PCT/CN2019/079441
§ 371 (c)(1),
(2) Date: Mar. 16, 2020

(87) PCT Pub. No.: WO2019/184837
PCT Pub. Date: Oct. 3, 2019

(65) Prior Publication Data
US 2020/0269691 A1 Aug. 27, 2020

(30) Foreign Application Priority Data
Mar. 26, 2018 (CN) .......................... 201810249971.8

(51) Int. Cl.
*B60K 35/00* (2006.01)
*G02B 27/00* (2006.01)
*G02B 27/01* (2006.01)

(52) U.S. Cl.
CPC .......... *B60K 35/00* (2013.01); *G02B 27/0093* (2013.01); *B60K 2370/52* (2019.05); *G02B 2027/0187* (2013.01)

(58) Field of Classification Search
CPC .. B60K 35/00; B60K 37/06; B60K 2370/149; B60K 2370/182; B60K 2370/52;
(Continued)

(56) References Cited

U.S. PATENT DOCUMENTS 10,540,008 B2 * 1/2020 Klingström ............. G06F 3/017
2013/0097557 A1 4/2013 Madau et al.
(Continued)

FOREIGN PATENT DOCUMENTS

CN 104866089 A 8/2015
CN 105301774 A 2/2016
(Continued)

OTHER PUBLICATIONS

International Search Report received for PCT Patent Application No. PCT/CN2019/079441, dated Jul. 1, 2019, 7 pages (3 pages of English Translation and 4 pages of Original Document).
(Continued)

*Primary Examiner* — Nelson M Rosario
(74) *Attorney, Agent, or Firm* — Womble Bond Dickinson (US) LLP

(57) ABSTRACT

A control method for a vehicle-carried display device including a plurality of displays is disclosed. The control method including: acquiring a sequence of visual field images comprising gaze points in real time through gaze tracking; determining whether at least one display of the plurality of displays is focused based on the acquired sequence of visual field images; and controlling the plurality of displays according to a result of the determination.

17 Claims, 5 Drawing Sheets

(58) Field of Classification Search
CPC ...... B60K 2370/1529; B60K 2370/334; B60K 2370/73; B60K 2370/774; B60K 2370/152; B60K 2370/184; B60K 2370/736; B60K 2370/777; B60R 1/00; B60R 2300/205; B60R 2300/305; B60R 2300/308; G02B 27/0093; G02B 27/0101; G02B 2027/014; G02B 2027/0187; G02B 27/01; A61B 3/113; A61B 5/163; A61B 5/18; G06V 20/597; G06V 40/19; B60Q 9/00; B60W 50/08; G06F 3/013; G06F 3/1423
See application file for complete search history.

(56) References Cited

U.S. PATENT DOCUMENTS

| | | | |
|---|---|---|---|
| 2015/0241961 A1 | 8/2015 | Morris et al. | |
| 2016/0196098 A1 | 7/2016 | Roth et al. | |
| 2017/0185146 A1* | 6/2017 | Groh | B60R 1/00 |
| 2017/0364148 A1 | 12/2017 | Kim | |
| 2018/0032300 A1 | 2/2018 | Singh et al. | |
| 2020/0319705 A1* | 10/2020 | Rohrbacher | G06F 3/04842 |

FOREIGN PATENT DOCUMENTS

| | | |
|---|---|---|
| CN | 106740581 A | 5/2017 |
| CN | 106926698 A | 7/2017 |
| CN | 107278187 A | 10/2017 |
| CN | 108501809 A | 9/2018 |
| EP | 3040809 A1 | 7/2016 |

OTHER PUBLICATIONS

Office Action received for Chinese Patent Application No. 201810249971.8, dated Aug. 2, 2019, 16 pages (8 pages of English Translation and 8 pages of Office Action).

Office Action received for Chinese Patent Application No. 201810249971.8, dated Jan. 15, 2020, 16 pages (10 pages of English Translation and 6 pages of Office Action).

Office Action received for Chinese Patent Application No. 201810249971.8, dated May 29, 2020,16 pages (11 pages of English Translation and 5 pages of Office Action).

* cited by examiner

CONTROL METHOD AND CONTROL DEVICE FOR VEHICLE DISPLAY DEVICE

CROSS REFERENCE TO RELATED APPLICATIONS

The present application is a 35 U.S.C. 371 national stage application of PCT International Application No. PCT/CN2019/079441, filed on Mar. 25, 2019, which claims the benefit of Chinese Patent Application No. 201810249971.8, filed on Mar. 26, 2018, the entire disclosures of which are incorporated herein by reference.

TECHNICAL FIELD

The present disclosure relates to the field of display technologies, and more specifically to a control method and a control device for a vehicle display device.

BACKGROUND

With the increasing popularity of cars in life, people's requirements for driving experience are also increasing. Both a Head-Up Display (HUD) and a smart rear-view mirror can enable drivers to view information of interest such as a vehicle condition without lowering their heads during driving.

However, at present, the head-up display only has display function, but cannot directly interact with the driver. On the other hand, the smart rear-view mirror with touch screens facilitates the operation of interface interactions. However, the display function of the smart rear-view mirror is limited due to limitations of position and screen size thereof. At present, a cooperative display scheme of the HUD and the smart rear-view mirror is performed by the following two ways. Firstly, both of the HUD and the smart rear-view mirror are displayed at the same time. Although this scheme improves convenience and user experience, simultaneous display on two screens will increase power consumption. Secondly, the HUD and the smart rear-view mirror are displayed alternately. However, there is a need to switch manually by the driver in this case, which increases the danger of the driver during driving.

SUMMARY

It is an object of the present disclosure to provide a control device and a control method for a vehicle-carried display device based on gaze tracking.

According to a first aspect of the disclosure, there is provided a control method for a vehicle-carried display device comprising a plurality of displays, the method comprising:

acquiring a sequence of visual field images comprising gaze points in real time through gaze tracking;

determining whether at least one display of the plurality of displays is focused based on the acquired sequence of visual field images; and controlling the plurality of displays according to a result of the determination.

In some embodiments according to the present disclosure, the step of determining whether at least one display of the plurality of displays is focused based on the acquired sequence of visual field images comprises:

recognizing, by using an object recognition algorithm, whether a display area of at least one display of the plurality of displays is present in the acquired sequence of visual field images;

in response to presence of the display area of at least one display of the plurality of displays in the acquired sequence of visual field images, detecting whether the gaze points are in the display area of the at least one display and whether a duration for which the gaze points are in the display area of the at least one display exceeds a first threshold time; and in response to the gaze points being in the display area of the at least one display and the duration exceeding the first time threshold, determining that the at least one display is focused.

In some embodiments according to the present disclosure, the step of determining whether at least one display of the plurality of displays is focused based on the acquired sequence of visual field images comprises:

recognizing, by using an object recognition algorithm, whether display areas of at least two displays of the plurality of displays are present in the acquired sequence of visual field images;

in response to presence of display areas of at least two displays of the plurality of displays in the acquired sequence of visual field images, detecting whether the gaze points are respectively in the display areas of the at least two displays multiple times within a second threshold time; and in response to the gaze points are respectively in the display areas of the at least two displays multiple times within the second threshold time, determining that the at least two displays are focused.

In some embodiments according to the present disclosure, the step of controlling the plurality of displays according to a result of the determination comprises:

in response to a display area of at least one display of the plurality of displays being focused, turning on the at least one display and turning off other displays of the plurality of displays; and in response to no display area in the plurality of displays being focused, turning off the plurality of displays.

In some embodiments according to the present disclosure, the plurality of displays comprises a head-up display and a smart rear-view mirror.

In some embodiments according to the present disclosure, the first threshold time ranges from 1 second to 2 seconds.

In some embodiments according to the present disclosure, the second threshold time ranges from 1 minute to 2 minutes.

According to a second aspect of the present disclosure, there is provided a control device for a vehicle-carried display device, the vehicle-carried display device comprising a plurality of displays, the control device comprising:

a gaze tracker configured to acquire a sequence of visual field images comprising gaze points in real time;

a determination unit configured to determine whether at least one display of the plurality of displays is focused based on the acquired sequence of visual field images; and a control unit configured to control the plurality of displays according to a result of the determination.

In some embodiments according to the present disclosure, the determination unit comprises:

a first recognition sub-unit configured to recognize, by using an object recognition algorithm, whether a display area of at least one display of the plurality of displays is present in the acquired sequence of visual field images;

a first detection sub-unit configured to, in response to presence of the display area of at least one display of the plurality of displays in the acquired sequence of visual field images, detect whether the gaze points are in the display area of the at least one display and whether a duration for which the gaze points are in the display area of the at least one display exceeds a first threshold time; and a first determination sub-unit configured to, in response to the gaze points being in the display area of the at least one display and the duration exceeding the first time threshold, determine that the at least one display is focused.

In some embodiments according to the present disclosure, the determination unit comprises:

a second recognition sub-unit configured to recognize, by using an object recognition algorithm, whether display areas of at least two displays of the plurality of displays are present in the acquired sequence of visual field images;

a second detection sub-unit configured to, in response to presence of display areas of at least two displays of the plurality of displays in the acquired sequence of visual field images, detect whether the gaze points are respectively in the display areas of the at least two displays multiple times within a second threshold time; and a second determination sub-unit configured to, in response to the gaze points are respectively in the display areas of the at least two displays multiple times within the second threshold time, determine that the at least two displays are focused.

In some embodiments according to the present disclosure, the control unit comprises:

a first control sub-unit configured to, in response to a display area of at least one display of the plurality of displays being focused, turn on the at least one display and turn off the other displays of the plurality of displays; and a second control sub-unit configured to, in response to no display area in the plurality of displays being focused, turn off the plurality of displays.

According to a third aspect of the present disclosure, there is provided a vehicle display system comprising: a vehicle-carried display device comprising a plurality of displays, and a control device for controlling the vehicle-carried display device according to some embodiments of the present disclosure.

In some embodiments according to the vehicle display system of the present disclosure, the determination unit comprises:

a first recognition sub-unit configured to recognize, by using an object recognition algorithm, whether a display area of at least one display of the plurality of displays is present in the acquired sequence of visual field images;

a first detection sub-unit configured to, in response to presence of the display area of at least one display of the plurality of displays in the acquired sequence of visual field images, detect whether the gaze points are in the display area of the at least one display and whether a duration for which the gaze points are in the display area exceeds a first threshold time; and a first determination sub-unit configured to, in response to the gaze points being in the display area of the at least one display and the duration exceeding the first time threshold, determine that the at least one display is focused.

In some embodiments according to the vehicle display system of the present disclosure, the determination unit comprises:

a second recognition sub-unit configured to recognize, by using an object recognition algorithm, whether display areas of at least two displays of the plurality of displays are present in the acquired sequence of visual field images;

a second detection sub-unit configured to, in response to presence of display areas of at least two displays of the plurality of displays in the acquired sequence of visual field images, detect whether the gaze points are respectively in the display areas of the at least two displays multiple times within a second threshold time; and a second determination sub-unit configured to, in response to the gaze points are respectively in the display areas of the at least two displays multiple times within the second threshold time, determine that the at least two displays are focused.

In some embodiments according to the vehicle display system of the present disclosure, the control unit comprises:

a first control sub-unit configured to, in response to a display area of at least one display of the plurality of displays being focused, turn on the at least one display and turn off the other displays of the plurality of displays; and a second control sub-unit configured to, in response to no display area in the plurality of displays being focused, turn off the plurality of displays.

According to a fourth aspect of the present disclosure, there is provided a computer-readable storage medium having stored thereon a computer program that, when executed, performs the control method for the vehicle-carried display device according to some embodiments of the present disclosure.

DETAILED DESCRIPTION OF EMBODIMENTS

Figure 1:
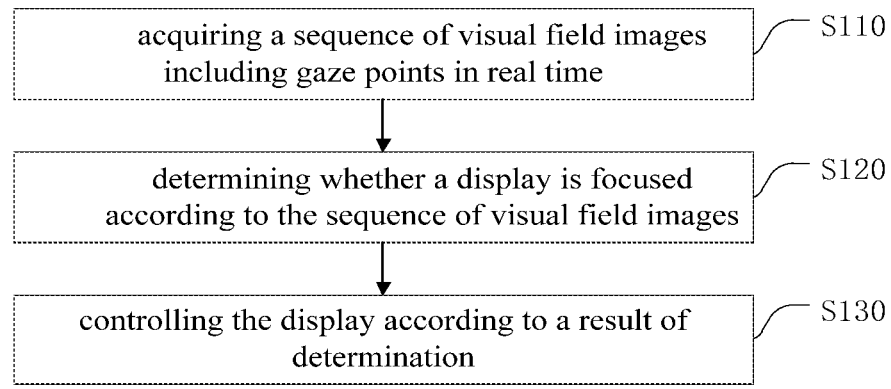
FIG. 1 shows a flowchart of a control method for a vehicle-carried display device according to some embodiments of the present disclosure.

In order to explain the present disclosure more clearly, the present disclosure is further described below with reference to the preferred embodiments and the accompanying drawings. Similar parts in the drawings are indicated by the same reference numerals. Those skilled in the art should understand that what is specifically described below is illustrative and not restrictive, which should not limit the protection scope of the present disclosure.

FIG. 1 shows a flowchart of a control method for a vehicle-carried display device according to some embodiments of the present disclosure. A vehicle-carried display device can include various displays, such as head-up display, smart rear-view mirror, central console display, dashboard display, etc., the display contents of which can include not only the information about the vehicle, such as vehicle speed, rotation speed, tire pressure, water temperature, and fault prompts, but also the environmental information, such as the temperature inside/outside the vehicle, and can even include the driving route information provided by a vehicle-carried navigation device or an external independent navigation device. In the control method for a vehicle-carried display device according to some embodiments of the present disclosure, the vehicle display screen that is focused by the driver is automatically recognized by the gaze tracking technology, and the respective displays are controlled accordingly. As shown in FIG. 1, the control method for a vehicle-carried display device according to some embodiments of the present disclosure includes the following steps S110-S130.

In step S110, a sequence of visual field images including gaze points is acquired in real time through gaze tracking.

Gaze tracking technology is also known as eye tracking technology, which refers to the technology of using various detection means such as software algorithms, mechanical, electronic, and optical methods to obtain the subject's current visual gaze direction or gaze point. It is widely used in multiple fields such as human-computer interaction, assistance driving, psychological research, virtual reality, and military. Generally, the gaze tracking can be achieved by a gaze (or eye) tracking device. The gaze tracking device mainly includes a dedicated gaze tracker and non-dedicated devices. For example, a camera on a computer or mobile phone can also achieve eye tracking with the support of software. However, different devices differ in accuracy, speed, and stability.

In some embodiments of the present disclosure, a gaze (or eye) tracker may be used to track the driver's gaze in real time, so as to use an image acquisition component therein to capture the driver's visual field image or visual field range in real time. The visual field image includes the current gaze point of the driver. In this way, by using the gaze tracker, a visual field image of the driver at any time can be obtained, thereby obtaining a sequence of visual field images including gaze points within a period of time. Subsequently, it is possible to determine whether the driver is focusing on the vehicle-carried display device by analyzing the positions of the gaze points in the sequence of visual field images.

In some embodiments, the gaze point in step S110 is usually the gaze point of the wearer of the gaze tracker. The wearer of the gaze tracker is usually the driver, but of course can also be other people in the vehicle, such as the co-pilot. Generally, the gaze point refers to a certain point of the object in which the gaze is aligned during the process of visual perception. In addition, the sequence of visual field images in step S110 refers to a plurality of visual field images continuously acquired in real-time by a gaze tracker, for example, a plurality of visual field images continuously recorded at a relatively high rate by a camera in the gaze tracker. For example, no less than 24 frames of images are recorded per second.

In step S120, it is determined whether at least one display of the plurality of displays is focused based on the acquired sequence of visual field images.

Generally, whether a display area of at least one display is focused by the driver can be simply determined by determining whether the driver's gaze point acquired at a certain time is located in the display area. For example, if the gaze point is in the display area, it may be determined that the display or the display area is being focused by the driver; if the gaze point is not in the display area, it may be determined that the display area is not focused by the driver. Optionally, in order to avoid mistakenly determining the driver's unintentional instantaneous gaze shift as focusing on the display area, an additional condition may be added on the basis of determining that the gaze point is in the display area, that is, the continuous retention time for which the gaze point is in the display area is long enough. Only when these two conditions are met simultaneously (the gaze point is in the display area and the continuous retention time is long enough), the display area is considered to be focused by the driver. For example, after it is determined that the gaze point is in the display area, it is detected whether the duration that the gaze point stays in the display area continuously reaches the expected duration, e.g., whether it exceeds a preset first time threshold. If so, it is determined that the driver is indeed focusing on the display area; otherwise, it is determined that the driver is not focusing on the display area.

In some embodiments, determination of a positional relationship between the gaze point and the display area of the display in the vehicle-carried display device may be implemented by using an object recognition method, such as a deep learning-based target detection algorithm That is, firstly, the above object recognition method is used to detect, in the sequence of visual field images, whether there is a display area of individual displays of the vehicle-carried display device; then the positional relationship between the gaze point and the detected display area is determined; and finally it is determined whether the area is focused according to whether the gaze point is in the display area and whether the duration exceeds a threshold time. Please refer to FIG. 2 for the above detailed steps. Optionally, of course, the positional relationship between the gaze point and the display area of the display in the vehicle-carried display device may also be determined by other methods, for example by comparing the visual field image including the gaze point with the image of the display area of each display.

In step S130, the plurality of displays are controlled according to a result of the determination.

After the display area that the driver is focusing on is determined, based on the result of the determination, the control unit may issue an instruction to the vehicle-carried display device to control each display. In some embodiments, the controlling of the displays in the step 130 may include controlling the display on and off. For example, if it is determined that the plurality of displays all are not focused, all the displays may be turned off to save energy consumption; if it is determined that at least one display is being focused, for the purpose of saving energy consumption, only the display that the driver is focusing on may be turned on, while all of the other displays that are not focused are turned off. For example, during driving, if it has been determined that the driver's gaze is focusing on the front windshield area, e.g. the display area of the head-up display, the head-up display can be automatically turned on by sending a control instruction to the control chip of the vehicle-carried display device and at the same time, the other displays, such as the smart rear-view mirror display screen, center console screen, etc. can be automatically turned off. Optionally, the controlling of the display in the step 130 may not be limited to turning on and off the display, and may further include, for example, dimming the screens of all unfocused displays (for example, from a working state to a standby state) and lighting up the screen of the focused display (for example, returning from the standby state to the normal working state) in case it is determined that at least one display is focused. This saves energy consumption and avoids the adverse impact on the life of the device caused by frequently and fully turning on/off the displays.

Optionally, for the display device that the driver focuses on, other control methods may also be adopted. For example, for commonly used displays, such as dashboards, central console screens, etc., they can always be turned on; but only for less commonly used displays, such as smart rear-view mirrors or head-up displays, the above method is used to control their on and off. For the smart rear-view mirror and head-up display, if the driver's gaze points are alternately located in the display areas of both for a short period of time, it can be determined that the driver is focusing on the head-up display and the smart rear-view mirror at the same time. In this case, both of them can be simultaneously turned on to avoid frequently turning on/off the display device, which damages its circuit.

The control method for a vehicle-carried display device based on gaze tracking provided by the present disclosure can automatically recognize the vehicle-carried display screen that the driver' gaze is focusing on (such as a front windshield area projected by a head-up display, and a smart rearview mirror or other display areas) by tracking the gaze of the driver, and thus can automatically turn on the vehicle-carried display screen that the driver's gaze is focusing on for display, thereby avoiding driving safety risks caused by the driver manually turning on/off the displays such as the head-up display and the smart rear-view mirror. It can also avoid the waste of power consumption caused by all vehicle displays being turned on at the same time.

Figure 2:
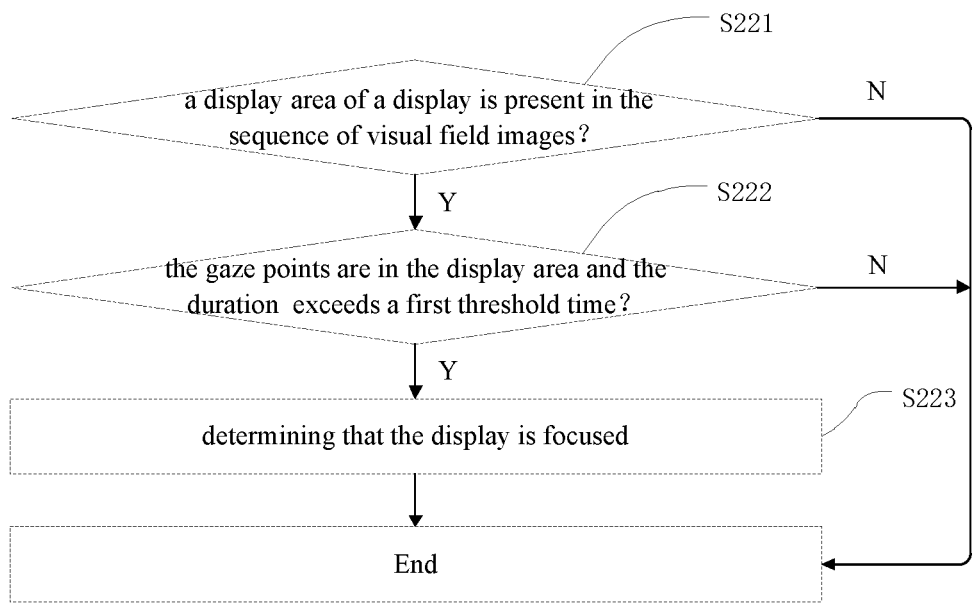
FIG. 2 shows a flowchart of a control method for a vehicle-carried display device according to some other embodiments of the present disclosure.

FIG. 2 shows a flowchart of a control method for a vehicle-carried display device according to some other embodiments of the present disclosure. As shown in FIG. 2, the step S120 shown in FIG. 1 of determining whether at least one display of the plurality of displays is focused based on the acquired sequence of visual field images includes the following steps S221-S223.

In step S221, it is recognized, by using an object recognition algorithm, whether a display area of at least one display of the plurality of displays is present in the acquired sequence of visual field images.

As described above, whether the display area is being focused by the driver can be determined by determining whether the gaze point is in the display area of the display of the vehicle-carried display device. Specifically, as shown in FIG. 2, after acquiring a visual field image including a gaze point through gaze tracking, firstly, it can be recognized or detected in the sequence of visual field images whether an object to be recognized, i.e., a display area of a vehicle display, is present in the visual field image. For example, a deep learning-based target detection algorithm such as Faster R-CNN, R-FCN, and SSD can be used to recognize whether there is the display area of the vehicle display in the visual field image. More specifically, the deep learning-based target detection algorithm can be selected firstly, and a display area of a target display, such as a smart rear-view mirror or a heads-up display, is used as a training sample to perform model training to obtain an object recognition model for use on the recognition and detection of the object (the display area of the target display) in the visual field image.

In step S222, in response to presence of the display area of at least one display of the plurality of displays in the acquired sequence of visual field images, it is detected whether the gaze points are in the display area of the at least one display and whether a duration for which the gaze points are in the display area exceeds a first threshold time.

In step S223, in response to the gaze points being in the display area of the at least one display and the duration exceeding the first time threshold, it is determined that the at least one display is focused.

When the display area is detected or recognized in the visual field image, that is, the display area of the vehicle display is present in the sequence of visual field images, the relationship between the position of the gaze point and the position of the display area is further detected, that is, whether the gaze point falls within the display area. If the gaze point falls within the display area, it can be determined that the display area is being focused by the driver. Generally, the detection of the positional relationship between the gaze point and the recognized display area can be simply achieved by determining whether the coordinates of the gaze point position in the visual field image fall within the display area by means of a planar geometry method.

In the above-mentioned embodiments of the present disclosure, the position of the display area of the vehicle display in the image sequence (if the display area is present in the image) is determined by performing object recognition on the sequence of visual field images including the gaze point. In fact, it is possible to place the gaze point and the display area in the same visual field image, which is very helpful to determine whether the gaze point is in the display area, and then to determine whether the display area is focused by the driver.

In addition, in order to avoid mistakenly determining the driver's unintentional instantaneous gaze shift as focusing on the display area, an additional condition may be added on the basis of determining that the gaze point is in the display area, that is, the continuous retention time of the gaze point in the display area is long enough. Only when these two conditions are met simultaneously (the gaze point is in the display area and the continuous retention time is long enough), the display area is considered to be focused by the driver. For example, after it is determined that the gaze point is in the display area, it is detected whether the duration that the gaze point stays in the display area continuously reaches the expected duration, e.g., whether it exceeds a preset first time threshold, by timing while capturing the sequence of visual field images in real time. If so, it is determined that the driver is indeed focusing on the display area; otherwise, it is determined that the driver is not focusing on the display area.

In some embodiments, the first threshold time may be a preset time period, for example, the value range may be 1-2 seconds. Of course, the first threshold time can also adopt other ranges, and, for example, it can be set according to the driving habits of the driver or other environmental factors.

Figure 3:
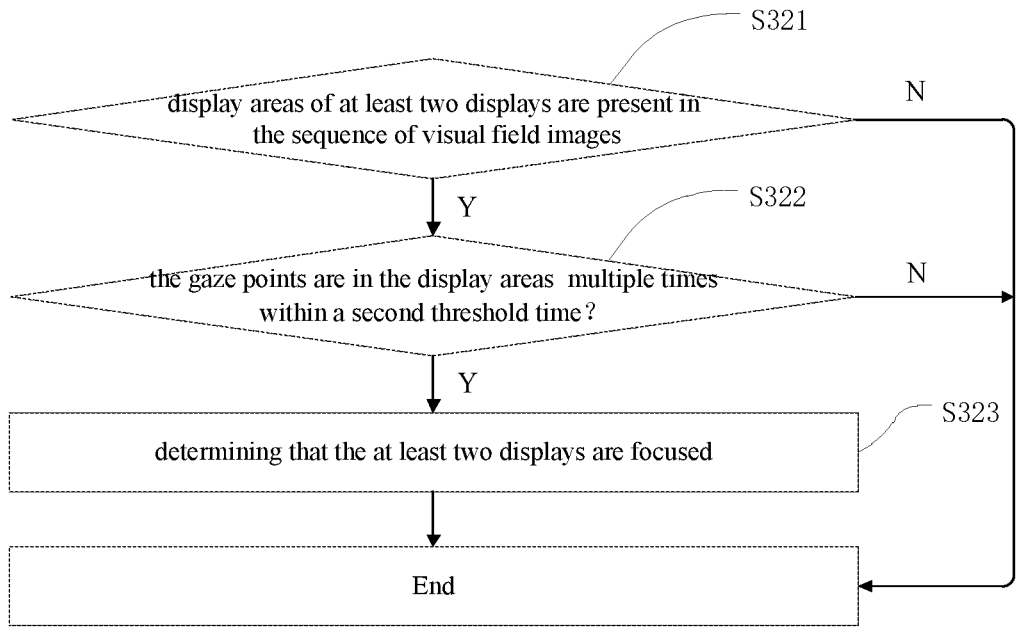
FIG. 3 shows a flowchart of a control method for a vehicle-carried display device according to yet other embodiments of the present disclosure.

FIG. 3 shows a flowchart of a control method for a vehicle-carried display device according to yet other embodiments of the present disclosure. Compared with the embodiment shown in FIG. 2 in which it is determined that the display area is focused by the fact that the gaze points stay in a certain display area for a preset period of time, in the embodiment in FIG. 3 another situation is mainly considered. For various reasons, it is possible for the driver's gaze points to frequently switch between at least two display areas in a short time. For example, in the face of complex road conditions, the driver may need to focus on the plurality of displays at the same time, such as the smart rear-view mirror and the head-up display, to understand the road and vehicle conditions in all directions in order to drive the vehicle flexibly and safely. In this case, when determining the display that the driver is focusing on, it is necessary to consider the positions of the at least two displays in the sequence of visual field images and whether the gaze points switch between the two displays frequently within a preset time, e.g., during the second time threshold, i.e., whether the gaze points are respectively located in the display areas of the two displays for multiple times.

Specifically, as shown in FIG. 3, the step S120 shown in FIG. 1 of determining whether at least one display of the plurality of displays is focused based on the acquired sequence of visual field images may also include:

step S321, recognizing, by using an object recognition algorithm, whether display areas of at least two displays of the plurality of displays are present in the acquired sequence of visual field images;

step S322, in response to presence of display areas of at least two displays of the plurality of displays in the acquired sequence of visual field images, detecting whether the gaze points are respectively in the display areas of the at least two displays multiple times within a second threshold time; and step S323, in response to the gaze points are respectively in the display areas of the at least two displays multiple times within the second threshold time, determining that the at least two displays are focused.

In some embodiments, the second threshold time may be a preset time period, for example, the value range may be 1-2 minutes. For example, if it is determined that the driver's gaze points are in the front windshield area (that is, the display area of the head-up display) for at least two or more times within one minute, and are in the smart rear-view mirror area for at least two or more times within one minute, it can be proved that the driver is frequently focusing on the front windshield area and the smart rear-view mirror area alternately in a short period of time, and then it can be determined that both of them are being focused by the driver. At this time, both can be turned on at the same time to avoid frequently turning on/off the display device, which damages its circuit. Of course, the second threshold time can also adopt other ranges, and, for example, can be set according to the driving habits of the driver or other environmental factors.

Figure 4:
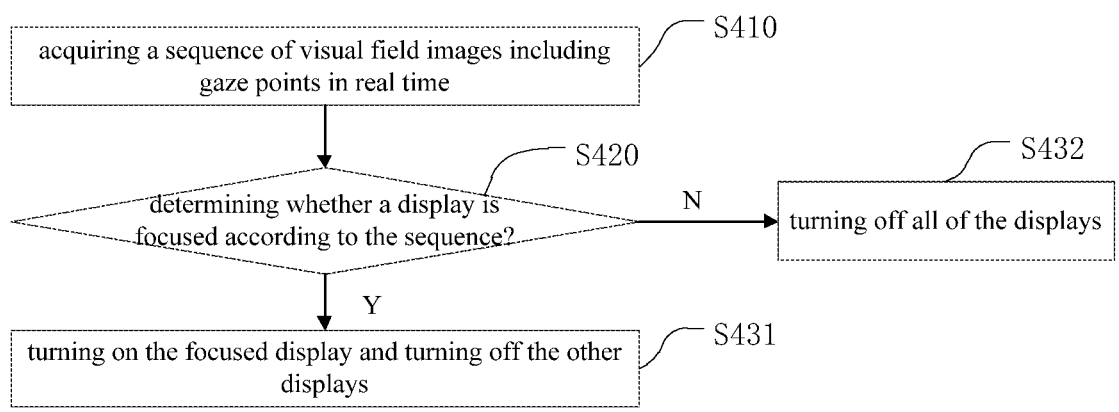
FIG. 4 shows a flowchart of a control method for a vehicle-carried display device according to still other embodiments of the present disclosure.

FIG. 4 shows a flowchart of a control method for a vehicle-carried display device according to still other some embodiments of the present disclosure. As shown in FIG. 4, steps S410 and S420 are the same as the steps S110 and S120 shown in FIG. 1 respectively. The step S130 shown in FIG. 1 of controlling the plurality of displays according to a result of the determination includes:

step S431, in response to a display area of at least one display of the plurality of displays being focused, turning on the at least one display and turning off other displays of the plurality of displays; and step S432, in response to no display area in the plurality of displays being focused, turning off the plurality of displays.

As described above, after the display area that the driver is focusing on is determined, an instruction can be issued to the vehicle-carried display device through the control unit or control module to control the turning on and/or off of each display. As shown in FIG. 4, if it is determined that the plurality of displays all are not focused, all displays may be turned off to save energy consumption. If it is determined that at least one display is focused, for the purpose of saving energy consumption, only the display that the driver is focusing on may be turned on while all of the other displays that the driver is not focusing on may be turned off. For example, during driving, if it has been determined that the driver's gaze is focusing on the front windshield area, i.e., the display area of the heads-up display, at this time the head-up display can be automatically turned on by issuing a control instruction to the control chip of the vehicle-carried display device while the other displays such as a smart rear-view mirror display screen and a central console screen can be automatically turned off.

Accordingly, the present disclosure also provides a computer-readable storage medium having stored thereon a computer program that, when executed, implements a control method for a vehicle-carried display device according to some embodiments of the present disclosure.

Figure 5A:
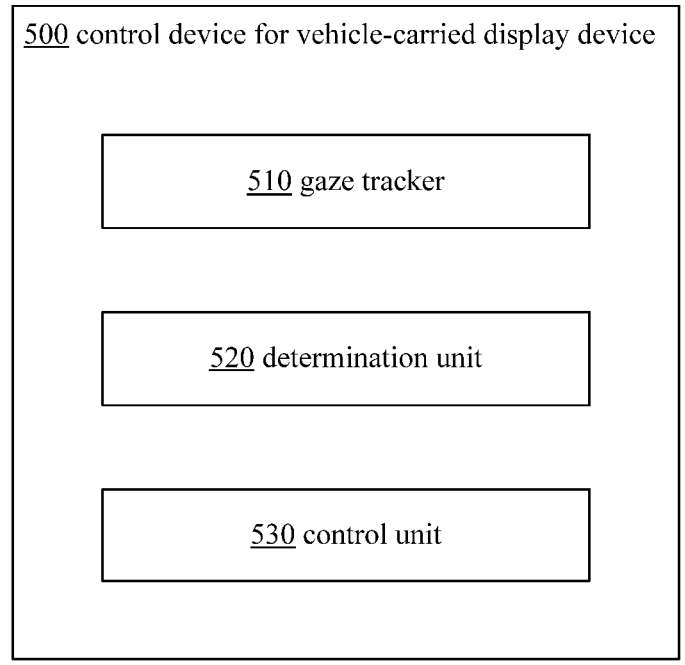
FIG. 5a shows a structural block diagram of a control device for a vehicle-carried display device according to some embodiments of the present disclosure.

FIG. 5a shows a control device for a vehicle-carried display device including a plurality of displays according to some embodiments of the present disclosure. The control method for a vehicle-carried display device according to some embodiments of the present disclosure may be implemented by the control device shown in FIG. 5a.

As shown in FIG. 5a, in some embodiments, the control device 500 includes:

a gaze tracker 510 configured to acquire a sequence of visual field images including the driver's gaze points in real time;

a determination unit 520 configured to determine whether at least one display of the plurality of displays is focused based on the acquired sequence of visual field images; and a control unit 530 configured to control the plurality of displays according to a result of the determination.

The control device for a vehicle-carried display device based on gaze tracking provided by the present disclosure can automatically recognize the vehicle display screen that the driver' gaze is focusing on (such as a front windshield area projected by a head-up display, and a smart rearview mirror or other display areas) by tracking the gaze of the driver, and can thus automatically turn on the vehicle display screen that the driver's gaze is focusing on for display, thereby avoiding driving safety risks caused by the driver manually turning on/off the displays such as the head-up display and the smart rear-view mirror. It can also avoid the waste of power consumption caused by the all vehicle displays being turned on at the same time.

In a specific embodiment, the control device 500 according to the present disclosure can be made into a head-mounted device, and thus the gaze tracker 510, the determination unit 520, and the control unit 530 can be for example provided in the head-mounted device, and can communicate with the vehicle-carried display device to be controlled via a communication way such as a wired and wireless (such as WIFI, Bluetooth). The determination unit 520 and the control unit 530 may include a central processing unit (CPU), a read-only memory (ROM) for storing programs executed by the CPU and data used in these programs; a random access memory (RAM) for temporarily storing the data used in the execution of these programs, These constituent components operate in cooperation to perform the functions of the determination unit 520 and/or the control unit 530. It will be understood that these functions may be implemented by software, hardware, or a combination thereof.

Figure 5B:
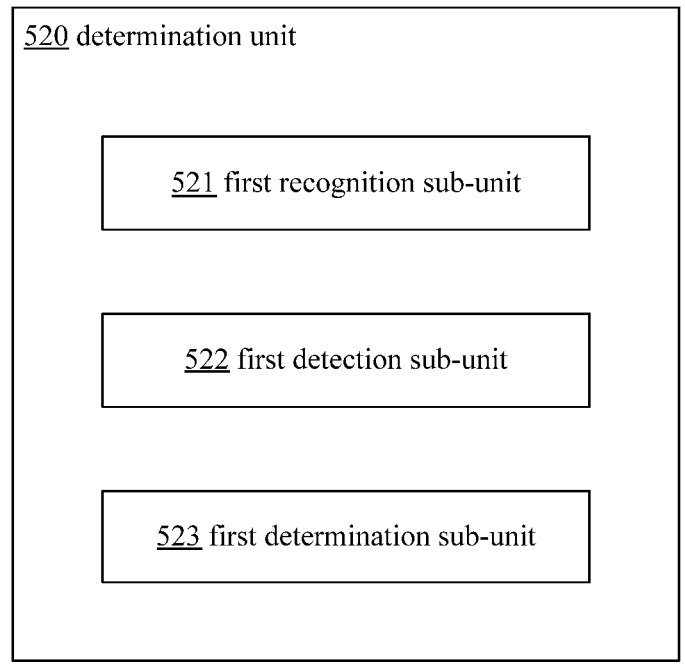
FIG. 5b shows a structural block diagram of a determination unit in a control device for a vehicle-carried display device according to some embodiments of the present disclosure.

FIG. 5b shows a structural block diagram of a determination unit in a control device for a vehicle-carried display device according to some embodiments of the present disclosure. In some embodiments, referring to FIG. 5b, the determining unit 520 includes:

a first recognition sub-unit 521 configured to recognize, by using an object recognition algorithm, whether a display area of at least one display of the plurality of displays is present in the acquired sequence of visual field images;

a first detection sub-unit 522 configured to, in response to presence of the display area of at least one display of the plurality of displays in the acquired sequence of visual field images, detect whether the gaze points are in the display area of the at least one display and whether a duration for which the gaze points are in the display area exceeds a first threshold time; and a first determination sub-unit 523 configured to, in response to the gaze points being in the display area of the at least one display and the duration exceeding the first time threshold, determine that the at least one display is focused.

Figure 5C:
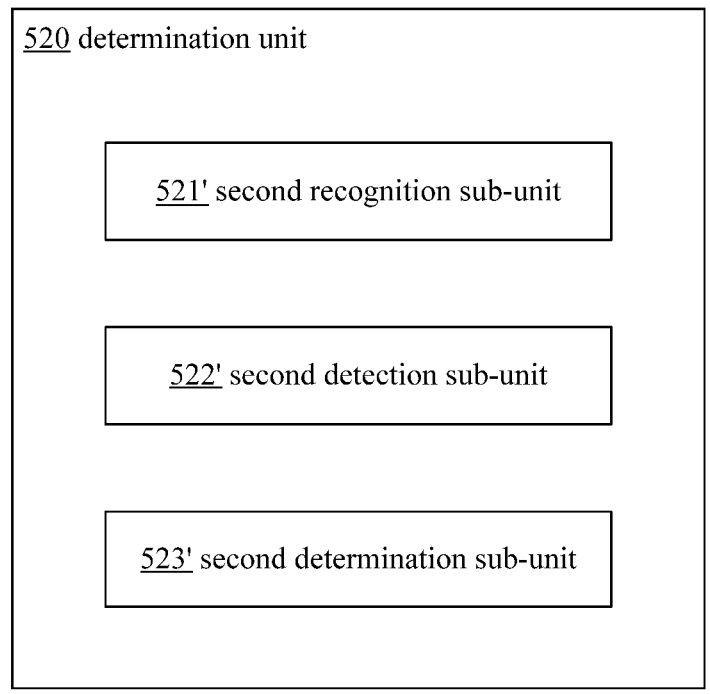
FIG. 5c shows a structural block diagram of a determination unit in a control device for a vehicle-carried display device according to some other embodiments of the present disclosure.

FIG. 5c shows a block diagram of a determination unit in a control device for a vehicle-carried display device according to other embodiments of the present disclosure. In some embodiments, referring to FIG. 5c, the determination unit 520 includes:

a second recognition sub-unit 521' configured to recognize, by using an object recognition algorithm, whether display areas of at least two displays of the plurality of displays are present in the acquired sequence of visual field images;

a second detection sub-unit 522' configured to, in response to presence of display areas of at least two displays of the plurality of displays in the acquired sequence of visual field images, detect whether the gaze points are respectively in the display areas of the at least two displays multiple times within a second threshold time; and a second determination sub-unit 523' configured to, in response to the gaze points are respectively in the display areas of the at least two displays multiple times within the second threshold time, determine that the at least two displays are focused.

Figure 5D:
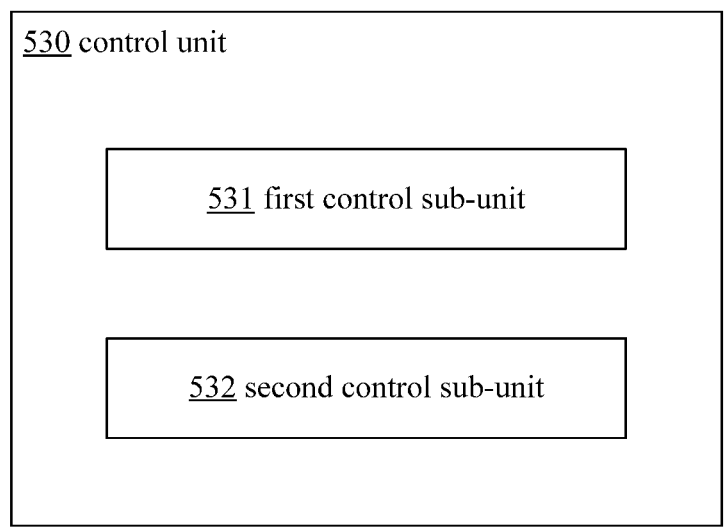
FIG. 5d shows a structural block diagram of a control unit in a control device for a vehicle-carried display device according to some embodiments of the present disclosure.

FIG. 5d shows a structural block diagram of a control unit in a control device for a vehicle-carried display device according to some embodiments of the present disclosure. In some embodiments, referring to FIG. 5d, the control unit 530 includes:

a first control sub-unit 531 configured to, in response to a display area of at least one display of the plurality of displays being focused, turn on the at least one display and turn off the other displays of the plurality of displays.

Optionally, as shown in FIG. 5c, the control unit 520 may further include:

a second control sub-unit 532 configured to, in response to no display area in the plurality of displays being focused, turn off the plurality of displays.

Figure 6:
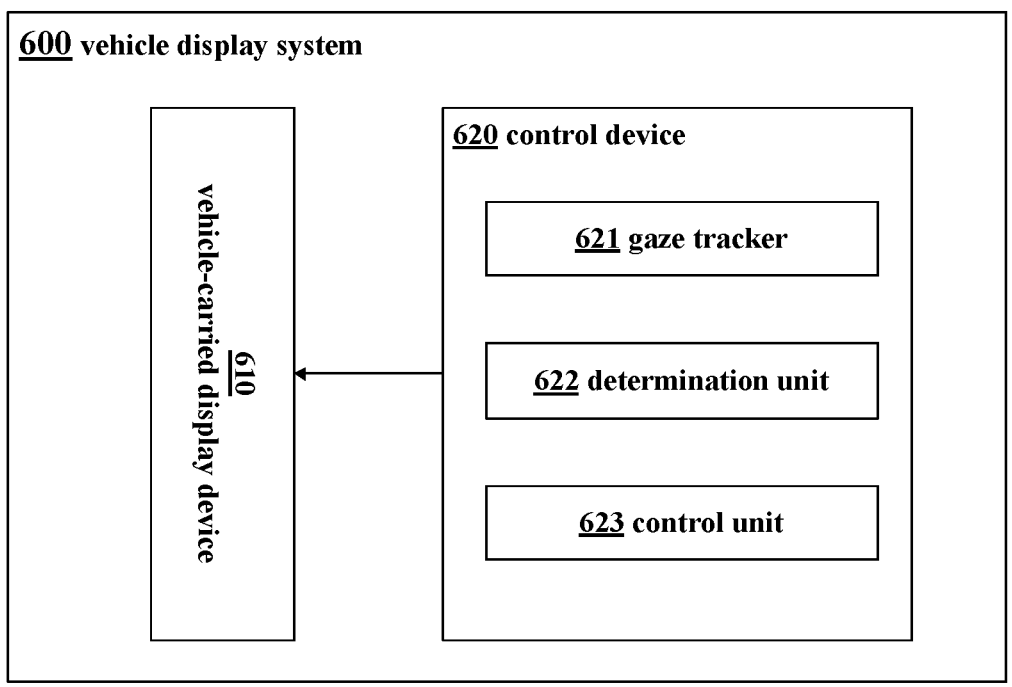
FIG. 6 shows a structural block diagram of a vehicle display system according to some embodiments of the present disclosure.

FIG. 6 schematically shows a structural diagram of a vehicle display system according to some embodiments of the present disclosure. As shown in FIG. 6, the vehicle display system 600 according to some embodiments of the present disclosure includes:

a vehicle-carried display device 610 including a plurality of displays, and a control device 620 for controlling the vehicle-carried display device 610 and including:

- a gaze tracker 621 configured to acquire a sequence of visual field images including the driver's gaze points in real time;
- a determination unit 622 configured to determine whether at least one display of the plurality of displays is focused based on the acquired sequence of visual field images; and
- a control unit 623 configured to control the plurality of displays according to a result of the determination.

In some embodiments, the control device 620 may correspond to the control device 500 for a vehicle-carried display device shown in FIG. 5a. Accordingly, the determination unit 622 and the control unit 623 in the control device 620 may also correspond to the determination unit 520 and the control unit 530 shown in FIGS. 5b-5d, respectively.

In the description of the present disclosure, it should be noted that, the terms indicating the orientation or positional relationships, such as "upper", "lower" are based on the orientation or positional relationships shown in the drawings, and are merely for the convenience of describing the present disclosure and the simplified description, and do not indicate or imply that the machines or components referred to must have a specific orientation, or be constructed and operated in a specific orientation. Therefore they are not to be construed as limiting the disclosure. Unless otherwise explicitly specified and defined, the terms "install", "couple", and "connect" are to be understood broadly, and may for example be fixedly connected or detachably connected, integrally connected; mechanically or electrically connected; directly connected, indirectly connected through an intermediate medium or internally connected between two components. The specific meanings of the above terms in the present disclosure can be understood in the specific circumstances by those skilled in the art.

It should also be noted that in the description of the present disclosure, relational terms such as first and second and the like may only be used to distinguish one entity or operation from another entity or operation without necessarily requiring or implying any actual relationship or order between such entities or operations. Furthermore, the term "comprise" or "include" or any other variations thereof is intended to encompass a non-exclusive inclusion, such that a process, method, article, or device that comprises a plurality of elements comprises not only those elements but also other elements not specifically listed, or elements that are inherent to such a process, method, article, or device. Without more restrictions, an element that is defined by the phrase "comprising a . . . " does not exclude the presence of additional equivalent elements in the process, method, article, or device that comprises the element.

Obviously, the foregoing embodiments of the present disclosure are merely examples for clearly explaining the present disclosure, and are not intended to limit the embodiments of the present disclosure. For a person of ordinary skill in the art, based on the above description, other different forms of changes or variations can also be made. It is not possible to exhaust all implementations herein. Any obvious changes or variations derived from the technical solutions of the present disclosure are still within the protection scope of the present disclosure.

In the description of the present specification, the descriptions of the terms "one embodiment", "some embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined or integrated by those skilled in the art without conflicting.

Any process or method description in the flowcharts or otherwise described herein can be understood to represent a module, segment or portion of code comprising one or more executable instructions for implementing the steps of a custom logic function or process. The scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer-readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium and may comprise, when executed, one or a combination of the steps of the execution method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

The invention claimed is:

1. A control method for a vehicle-carried display device comprising a plurality of displays, the method comprising:
   acquiring a sequence of visual field images comprising gaze points in real time through gaze tracking;
   determining whether at least one display of the plurality of displays is focused based on the acquired sequence of visual field images; and
   controlling the plurality of displays according to a result of the determination;
   wherein the step of determining whether at least one display of the plurality of displays is focused based on the acquired sequence of visual field images comprises:
   recognizing, by using an object recognition algorithm, whether display areas of at least two displays of the plurality of displays are present in the acquired sequence of visual field images;
   in response to presence of display areas of at least two displays of the plurality of displays in the acquired sequence of visual field images, detecting whether the gaze points switch between the display areas of the at least two displays multiple times within a first threshold time; and
   in response to the gaze points switching between the display areas of the at least two displays multiple times within the first threshold time, determining that the at least two displays are focused;
   wherein the step of controlling the plurality of displays comprises, in response to the display areas of at least two display of the plurality of displays being focused, turning on the at least two displays and turning off other displays of the plurality of displays.

2. The control method according to claim 1, wherein the step of determining whether at least one display of the plurality of displays is focused based on the acquired sequence of visual field images comprises:
   recognizing, by using an object recognition algorithm, whether a display area of at least one display of the plurality of displays is present in the acquired sequence of visual field images;
   in response to presence of the display area of at least one display of the plurality of displays in the acquired sequence of visual field images, detecting whether the gaze points are in the display area of the at least one display and whether a duration for which the gaze points are in the display area of the at least one display exceeds a second threshold time; and
   in response to the gaze points being in the display area of the at least one display and the duration exceeding the second threshold time, determining that the at least one display is focused.

3. The control method according to claim 2, wherein the second threshold time ranges from 1 second to 2 seconds.

4. The control method according to claim 2, wherein the step of controlling the plurality of displays according to a result of the determination comprises:
   in response to a display area of at least one display of the plurality of displays being focused, turning on the at least one display and turning off other displays of the plurality of displays; and
   in response to no display area in the plurality of displays being focused, turning off the plurality of displays.

5. The control method according to claim 1, wherein the step of controlling the plurality of displays according to a result of the determination comprises:

in response to a display area of at least one display of the plurality of displays being focused, turning on the at least one display and turning off other displays of the plurality of displays; and in response to no display area in the plurality of displays being focused, turning off the plurality of displays.

6. The control method according to claim 1, wherein the plurality of displays comprises a head-up display and a smart rear-view mirror.

7. The control method according to claim 1, wherein the first threshold time ranges from 1 minute to 2 minutes.

8. A non-transitory computer-readable storage medium having stored thereon a computer program that, when executed, performs the control method of claim 1.

9. The control method according to claim 1, wherein the step of controlling the plurality of displays according to a result of the determination comprises:

in response to a display area of at least one display of the plurality of displays being focused, turning on the at least one display and turning off other displays of the plurality of displays; and in response to no display area in the plurality of displays being focused, turning off the plurality of displays.

10. A control device for a vehicle-carried display device, the vehicle-carried display device comprising a plurality of displays, the control device comprising:

a gaze tracker configured to acquire a sequence of visual field images comprising gaze points in real time;

a determination circuit configured to determine whether at least one display of the plurality of displays is focused based on the acquired sequence of visual field images; and a control circuit configured to control the plurality of displays according to a result of the determination, wherein the determination circuit comprises:

a first recognition sub-circuit configured to recognize, by using an object recognition algorithm, whether display areas of at least two displays of the plurality of displays are present in the acquired sequence of visual field images;

a first detection sub-circuit configured to, in response to presence of display areas of at least two displays of the plurality of displays in the acquired sequence of visual field images, detect whether the gaze points switch between the display areas of the at least two displays multiple times within a first threshold time; and a first determination sub-circuit configured to, in response to the gaze points switching between the display areas of the at least two displays multiple times within the first threshold time, determine that the at least two displays are focused.

11. The control device according to claim 10, wherein the determination circuit comprises:

a second recognition sub-circuit configured to recognize, by using an object recognition algorithm, whether a display area of at least one display of the plurality of displays is present in the acquired sequence of visual field images;

a second detection sub-circuit configured to, in response to presence of the display area of at least one display of the plurality of displays in the acquired sequence of visual field images, detect whether the gaze points are in the display area of the at least one display and whether a duration for which the gaze points are in the display area of the at least one display exceeds a second threshold time; and a second determination sub-circuit configured to, in response to the gaze points being in the display area of the at least one display and the duration exceeding the second threshold time, determine that the at least one display is focused.

12. The control device according to claim 11, wherein the control circuit comprises:

a first control sub-circuit configured to, in response to a display area of at least one display of the plurality of displays being focused, turn on the at least one display and turn off the other displays of the plurality of displays; and a second control sub-circuit configured to, in response to no display area in the plurality of displays being focused, turn off the plurality of displays.

13. The control device according to claim 10, wherein the control circuit comprises:

a first control sub-circuit configured to, in response to a display area of at least one display of the plurality of displays being focused, turn on the at least one display and turn off the other displays of the plurality of displays; and a second control sub-circuit configured to, in response to no display area in the plurality of displays being focused, turn off the plurality of displays.

14. The control device according to claim 10, wherein the control circuit comprises:

a first control sub-circuit configured to, in response to a display area of at least one display of the plurality of displays being focused, turn on the at least one display and turn off the other displays of the plurality of displays; and a second control sub-circuit configured to, in response to no display area in the plurality of displays being focused, turn off the plurality of displays.

15. A vehicle display system comprising:

a vehicle-carried display device comprising a plurality of displays, and a control device configured to control the vehicle-carried display device and comprising:

a gaze tracker configured to acquire a sequence of visual field images comprising gaze points in real time;

a determination circuit configured to determine whether at least one display of the plurality of displays is focused based on the acquired sequence of visual field images; and a control circuit configured to control the plurality of displays according to a result of the determination;

wherein the determination circuit comprises:

a first recognition sub-circuit configured to recognize, by using an object recognition algorithm, whether display areas of at least two displays of the plurality of displays are present in the acquired sequence of visual field images;

a first detection sub-circuit configured to, in response to presence of display areas of at least two displays of the plurality of displays in the acquired sequence of visual field images, detect whether the gaze points switch between the display areas of the at least two displays multiple times within a first threshold time; and a first determination sub-circuit configured to, in response to the gaze points switching between the display areas of the at least two displays multiple times within the first threshold time, determine that the at least two displays are focused.

16. The system according to claim 15, wherein the determination circuit comprises:
- a second recognition sub-circuit configured to recognize, by using an object recognition algorithm, whether a display area of at least one display of the plurality of displays is present in the acquired sequence of visual field images;
- a second detection sub-circuit configured to, in response to presence of the display area of at least one display of the plurality of displays in the acquired sequence of visual field images, detect whether the gaze points are in the display area of the at least one display and whether a duration for which the gaze points are in the display area of the at least one display exceeds a second threshold time; and
- a second determination sub-circuit configured to, in response to the gaze points being in the display area of the at least one display and the duration exceeding the second threshold time, determine that the at least one display is focused.

17. The system according to claim 15, wherein the control circuit comprises:
- a first control sub-circuit configured to, in response to a display area of at least one display of the plurality of displays being focused, turn on the at least one display and turn off the other displays of the plurality of displays; and
- a second control sub-circuit configured to, in response to no display area in the plurality of displays being focused, turn off the plurality of displays.

* * * * *